US010974426B2

(12) United States Patent
Dario et al.

(10) Patent No.: US 10,974,426 B2
(45) Date of Patent: Apr. 13, 2021

(54) APPARATUS FOR INJECTION MOLDING OF PLASTIC MATERIALS

(71) Applicant: INGLASS S.p.A., San Polo di Piave (IT)

(72) Inventors: Alessandro Dario, San Polo di Piave (IT); Massimo Rossi, San Polo di Piave (IT); Massimo Bisetto, San Polo di Piave (IT); Massimo De Nadai, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 43 days.

(21) Appl. No.: 16/251,134

(22) Filed: Jan. 18, 2019

(65) Prior Publication Data

US 2019/0283297 A1 Sep. 19, 2019

(30) Foreign Application Priority Data

Mar. 13, 2018 (IT) .......................... 102018000003490

(51) Int. Cl.
*B29C 45/28* (2006.01)
*B29C 45/74* (2006.01)
(Continued)

(52) U.S. Cl.
CPC ........ *B29C 45/2737* (2013.01); *B29C 45/281* (2013.01); *B29C 45/7331* (2013.01);
(Continued)

(58) Field of Classification Search
CPC .............. B29C 45/2737; B29C 45/281; B29C 45/7331; B29C 45/74; B29C 2045/2753; B29C 2045/7271
See application file for complete search history.

(56) References Cited

U.S. PATENT DOCUMENTS 6,729,871 B2 * 5/2004 Sattler ................. B29C 45/2806
425/564
7,121,820 B2 * 10/2006 Tooman ............... B29C 45/281
425/145
(Continued)

FOREIGN PATENT DOCUMENTS

CN 105121121 A 12/2015
CN 206644251 U 11/2017
(Continued)

OTHER PUBLICATIONS

European Search Report dated Jul. 3, 2019. 7 pages.
(Continued)

*Primary Examiner* — Xiao S Zhao
*Assistant Examiner* — Emmanuel S Luk
(74) *Attorney, Agent, or Firm* — RMCK Law Group, PLC

(57) ABSTRACT

An apparatus for injection molding of plastic materials includes a mold having at least one plate, a hot runner distributor of the fluid plastic material, at least one injector and an actuator for controlling the opening and the closing of the injector, supported by the distributor and whose cooling is carried out by thermal exchange contact with the plate. Provided for the cooling of the jack actuator is at least one body made of thermally conductive material at least partly surrounding the actuator in an axially slidable manner and it is maintained in thermal exchange contact with the plate by a magnetic force and/or a fluid thrust and/or an electrical drive force.

12 Claims, 6 Drawing Sheets

(51) Int. Cl.
*B29C 45/27* (2006.01)
*B29C 45/73* (2006.01)
*B29C 45/72* (2006.01)

(52) U.S. Cl.
CPC ...... *B29C 45/74* (2013.01); *B29C 2045/2753* (2013.01); *B29C 2045/7271* (2013.01); *B29K 2995/0013* (2013.01)

(56) References Cited

U.S. PATENT DOCUMENTS

| | | | | |
|---|---|---|---|---|
| 7,125,246 | B2* | 10/2006 | Schmidt | B29C 45/2701 425/563 |
| 7,214,048 | B2* | 5/2007 | Kim | B29C 45/281 425/145 |
| 7,931,455 | B2* | 4/2011 | Tabassi | B29C 45/281 425/3 |
| 8,113,819 | B2* | 2/2012 | Mohammed | B29C 45/281 425/564 |
| 8,308,476 | B2* | 11/2012 | Tabassi | B29C 45/281 425/564 |
| 8,349,244 | B2* | 1/2013 | Wernz | B23P 17/04 264/328.8 |
| 9,144,929 | B2* | 9/2015 | Tan | G05B 15/02 |
| 9,144,930 | B2* | 9/2015 | Olaru | B29C 45/74 |
| 9,346,206 | B2* | 5/2016 | Bazzo | B29C 45/70 |
| 9,352,501 | B2* | 5/2016 | Stone | B29C 45/281 |
| 9,492,960 | B2* | 11/2016 | Galati | B29C 45/281 |
| 9,682,504 | B2* | 6/2017 | Tan | B29C 45/281 |
| 9,724,861 | B2* | 8/2017 | Antunes | B29C 45/281 |
| 9,944,006 | B2* | 4/2018 | Tan | B29C 45/72 |
| 9,981,414 | B2* | 5/2018 | Bazzo | B29C 45/77 |
| 9,987,783 | B2* | 6/2018 | Tan | B29C 45/281 |
| 10,046,496 | B2* | 8/2018 | Tan | B29C 45/03 |
| 10,052,801 | B2* | 8/2018 | Galati | F15B 21/044 |
| 10,166,709 | B2* | 1/2019 | Tan | B29C 45/7331 |
| 10,569,458 | B2* | 2/2020 | Galati | B29C 45/231 |
| 2006/0222726 | A1* | 10/2006 | Tooman | B29C 45/281 425/146 |
| 2009/0102099 | A1* | 4/2009 | Feick | B29C 45/281 264/402 |
| 2010/0047383 | A1* | 2/2010 | Tabassi | B29C 45/2806 425/564 |
| 2010/0092588 | A1* | 4/2010 | Tabassi | B29C 45/281 425/3 |
| 2010/0124579 | A1* | 5/2010 | Tabassi | B29C 45/281 425/3 |
| 2012/0225148 | A1* | 9/2012 | Tabassi | B29C 45/281 425/3 |
| 2012/0231109 | A1* | 9/2012 | Lee | B23P 17/04 425/547 |
| 2013/0316039 | A1 | 11/2013 | Blais et al. | |
| 2014/0041192 | A1 | 2/2014 | Lee | |
| 2014/0353875 | A1* | 12/2014 | Tan | B29C 45/72 264/328.15 |
| 2016/0082634 | A1* | 3/2016 | Tan | B29C 45/281 425/564 |
| 2016/0208951 | A1* | 7/2016 | Singh | F16K 31/082 |
| 2017/0100869 | A1* | 4/2017 | Tan | B29C 45/72 |

FOREIGN PATENT DOCUMENTS

| | | |
|---|---|---|
| DE | 202018001749 U1 | 4/2018 |
| JP | S61268421 A | 11/1986 |
| JP | H1097924 A | 4/1998 |

OTHER PUBLICATIONS

Italian Search Report dated Oct. 23, 2018 (7 pages).
Office Action dated Jan. 12, 2021 in connection with Japanese Patent Application No. 2019-009617 (3 pages).

* cited by examiner

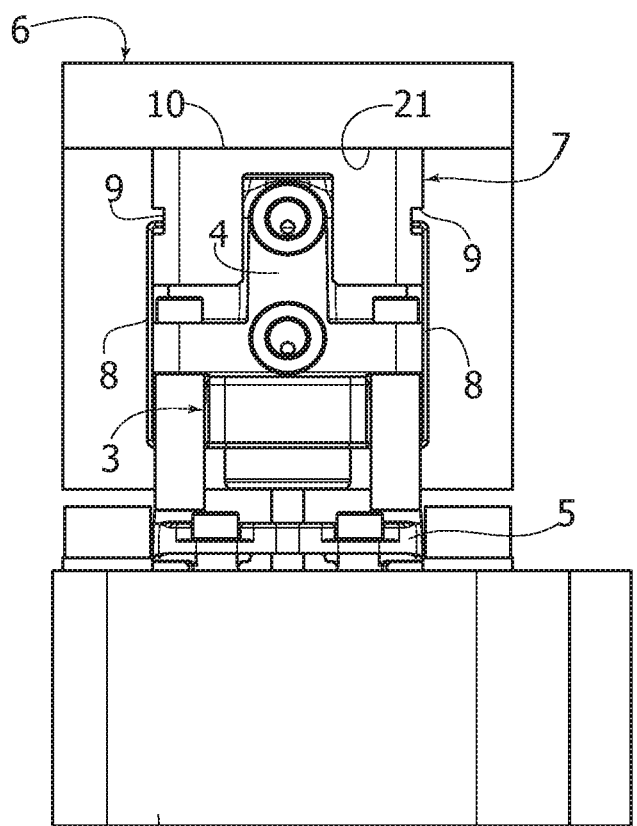
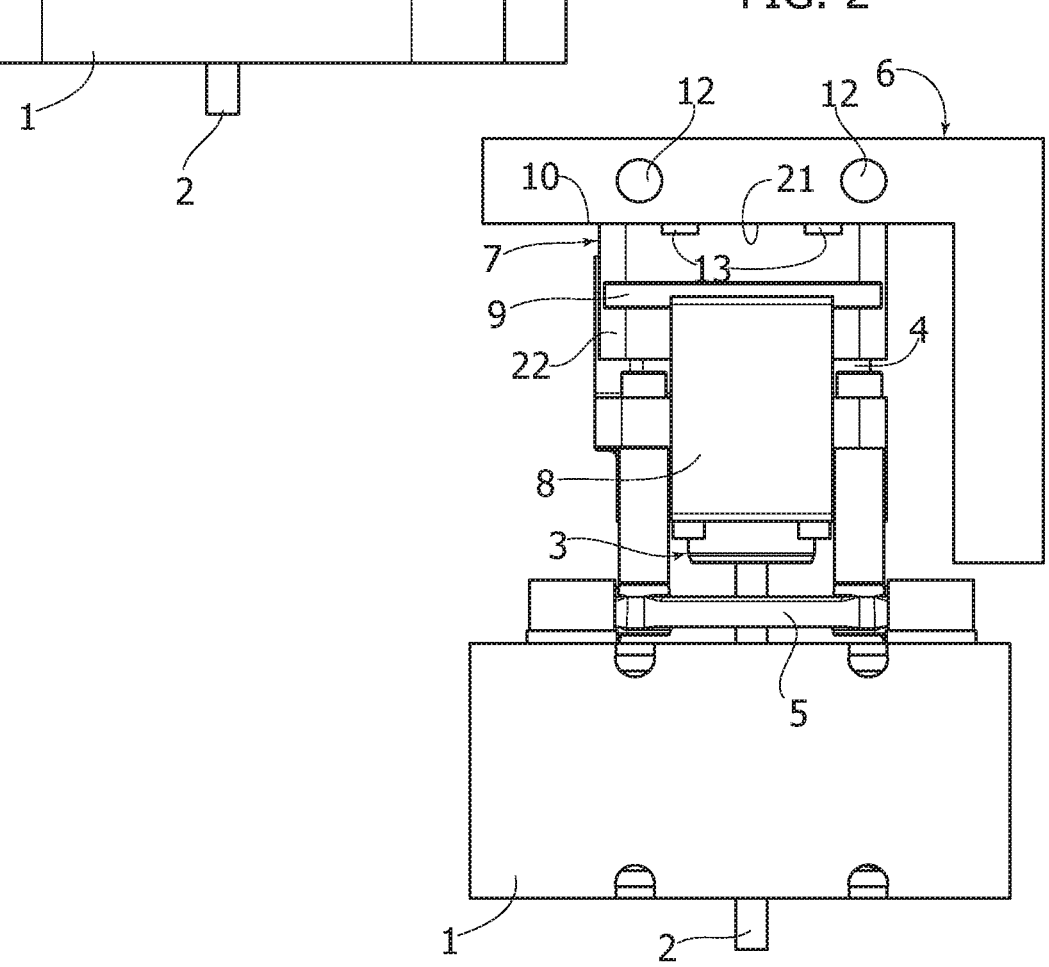

APPARATUS FOR INJECTION MOLDING OF PLASTIC MATERIALS

CROSS-REFERENCE TO RELATED APPLICATION

This application claims priority to Italian Patent Application No. 102018000003490 filed Mar. 13, 2018. The disclosure of the above application is incorporated herein by reference in its entirety.

FIELD OF THE INVENTION

The present invention refers to apparatus for injection molding of plastic materials of the type comprising a mold having a cavity and including at least one plate, a hot runner distributor of the fluid plastic material, at least one injector for the introduction of the plastic material from the distributor into the mold cavity, and an actuator for controlling the opening and closing of the injector.

More in particular, the invention refers to molding apparatus thus made wherein the actuator which actuates the injector, typically provided with a valve pin axially displaceable between a full closing position and a maximum opening position of the injector, consists in a fluid jack or in an electric motor supported by the distributor.

STATE OF THE PRIOR ART

During the operation of the molding apparatus the actuator, whether pneumatic or hydraulic or electric, is subjected to heating by means of the heat of the distributor, and it is conventionally cooled by means of an autonomous cooling hydraulic circuit. In some applications, even characterised by high temperatures of the mold, there arises the desire that the actuator, particularly in the case of the fluid jack, be without a cooling circuit so as to simplify the molding apparatus further. The heat of the hydraulic jack must however be dissipated, and solutions in which the cooling of the hydraulic jack occurs by means of thermal exchange with the aforementioned at least one mold plate were proposed for this purpose. As concerns this, it should be observed that the expression "mold plate" is used to indicate, in the description and in the claims that follow, the so-called mold clamping plate, as a whole or in relation with a component thereof in that it can consist of several adjacent plates, the die i.e. the fixed part of the mold, a plate of the distributor, as well as the plane of the press of the injection apparatus.

Solutions in which the cooling of the fluid jack occurs by means of the thermal exchange with a metal plate of the apparatus are for example disclosed by documents WO-2009/052611 on behalf of Mold Masters and documents WO-2011/119791 and US-2014041192, U.S. Pat. Nos. 8,349,244, 8,562,336, 8,728,378, EP-2550144, EP-2631059, WO-2015/183332, U.S. Pat. No. 9,682,504, US-2017/0246784, EP-3240666, US-2016/0361856, WO-2016/153608, WO-2016/153632, WO-2016/153703, WO-2016/153704 and WO-2016/153705 on behalf of Synventive Molding Solutions.

Provided in all these prior art solutions is an elastic thrust member, typically consisting of or including a metal spring, interposed between the cylinder of the hydraulic jack and the plate with the aim of guaranteeing the thermal exchange contact irrespective of the thermal dilation phenomena of the hot runner which supports the hydraulic jack directly or indirectly. The use of plastic thrust members is also considered necessary by the prior art so as not to have to demand high precision machining of the mold plate/s against which the cylinder of the actuator must be kept at thermal exchange contact.

The use of such elastic members entails construction complications and thus considerable costs, and the thermal exchange surface between the hydraulic jack and the plate made available by such elastic members is generally limited and thus scarcely efficient.

SUMMARY OF THE INVENTION

The object of the present invention is to overcome the aforementioned drawbacks and provide an apparatus for injection molding of plastic materials of the type defined above that allows to obtain an efficient thermal exchange cooling between the actuator and the mold plate in a more simple, economic and functional manner.

With the aim of attaining subject object, the main and peculiar characteristic of the invention resides in the fact that for the cooling of the actuator provided for is at least one body made of thermally conductive material that at least partly surrounds the actuator in an axially slidable manner and is kept in thermal exchange contact with the said at least one plate by at least one from among a magnetic force, a pressurised fluid thrust, an electrical drive force.

Should the actuator consist of a fluid jack, such hollow body conveniently has a radial wall faced to the cylinder of the hydraulic jack and defining a flat surface at contact with said at least one plate. Such radial wall may be restrained against the plate by a magnetic attractive or repulsive force, by a pressurised fluid or by a pneumatic or hydraulic thrust, or still by an electrical drive force, or the combination thereof.

The invention applies both to the case where the actuator is directly fixed to the hot runner, and in such case the aforementioned at least one plate may consist in the mold clamping plate or in the hot runner plate, or it can be indirectly fixed to the hot runner, laterally thereto, and in such case the aforementioned at least one plate consists of the die plate or hot runner plate. Alternatively, the aforementioned at least one plate may consist in an element of the press of the molding apparatus.

BRIEF DESCRIPTION OF THE DRAWINGS

The invention will now be described in detail with reference to the attached drawings, provided purely by way of non-limiting example, wherein:

FIG. 1 is a front elevational schematic view of a part of the molding apparatus for injection molding of plastic materials according to the invention, FIG. 2 is a lateral elevational view of FIG. 1.

DETAILED DESCRIPTION OF THE INVENTION

An apparatus for injection molding of plastic materials conventionally comprises a press (not illustrated) for sending the fluid plastic material to a distributor or hot runner 1 from which the plastic material is injected into the mold cavity (not illustrated) through one or more injectors. Each injector comprises a displaceable valve pin 2, relatively to a mold gate, between a full closing position and a maximum opening position. The displacement of the valve pin 2, and thus the opening and closing of the injector, occur through an actuator which, in the case of the present invention, consists of a fluid jack indicated in its entirety with 3, pneumatic or hydraulic. Alternatively, the actuator could consist in an electric motor.

Figure 3:
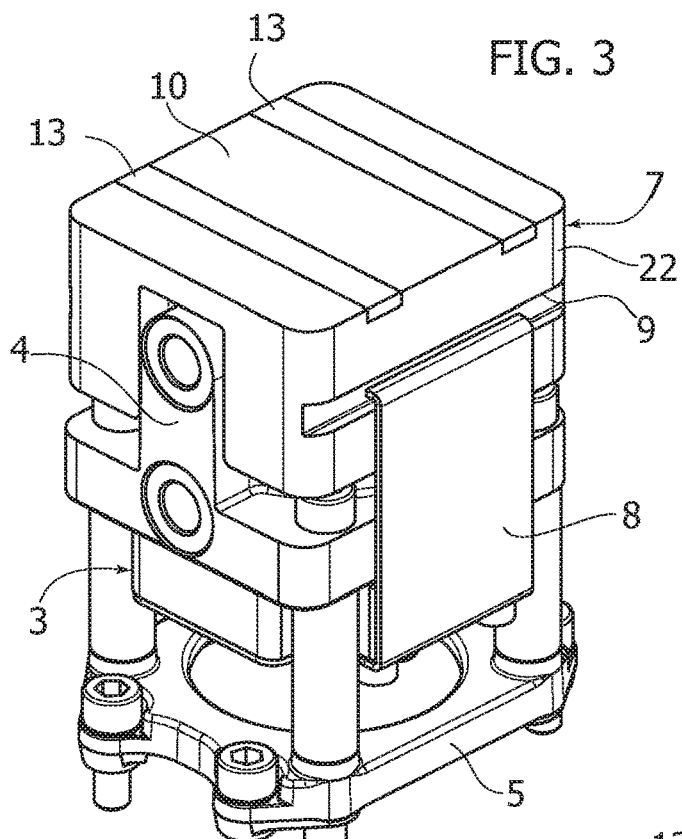
FIG. 3 is a perspective view of FIG. 1.
Figure 4:
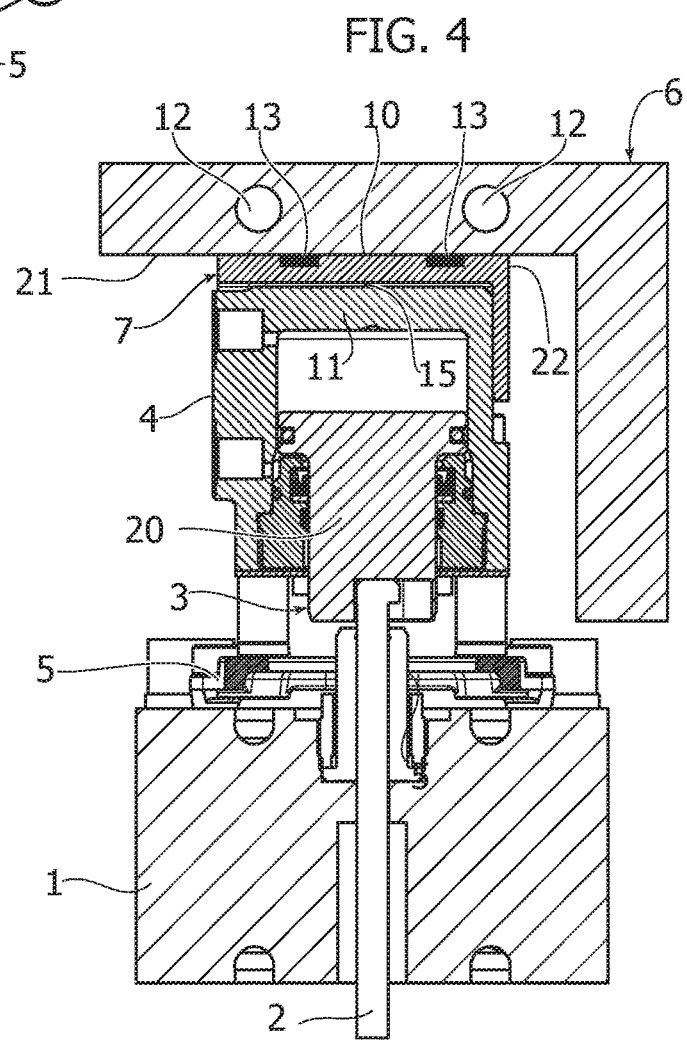
FIG. 4 is a vertical sectional view of FIG. 2.
Figure 5:
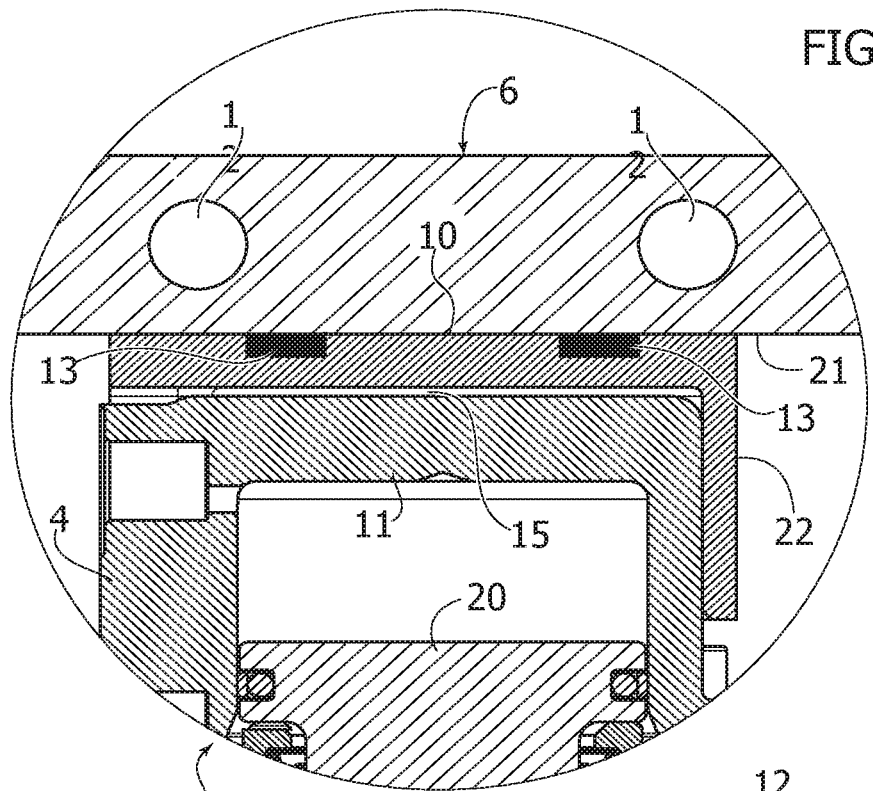
FIG. 5 shows—in an enlarged scale—a detail of FIG. 4.
Figure 6:
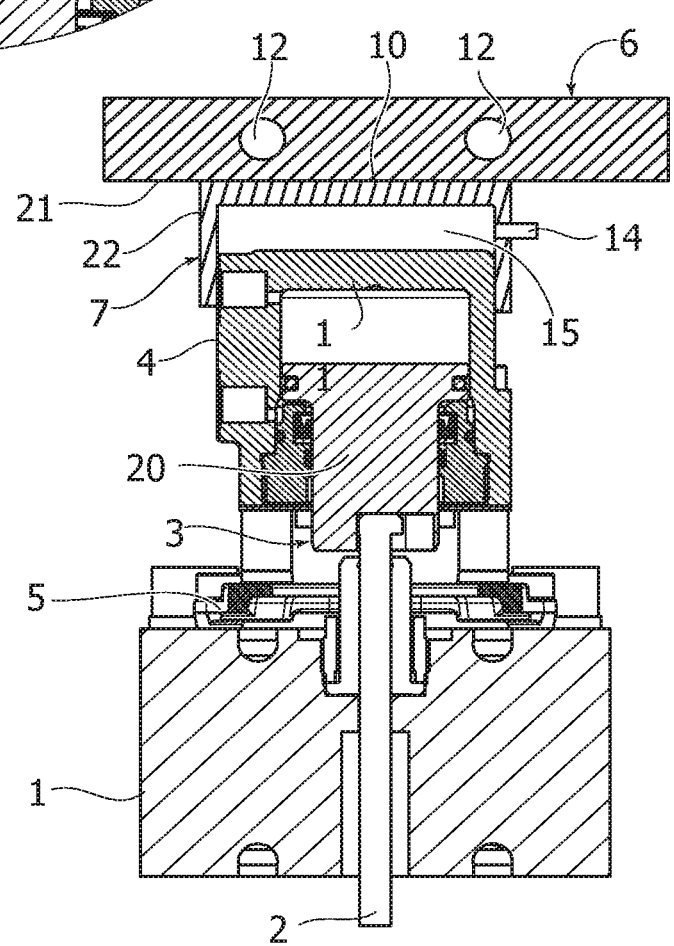
FIG. 6 shows a first variant of FIG. 4.

The hydraulic jack 3 comprises a cylinder 4 and a plunger 20 directly or indirectly connected to which is the valve pin 2 for example as shown in FIGS. 4, 6 e 7.

The cylinder 4 of the hydraulic jack 3 is supported by the distributor 1: in the case of the embodiments represented in FIGS. 1 to 8 the cylinder 4 is directly fixed onto the distributor 1, by means of a fixing unit generally indicated with 5. Alternatively, the cylinder 4 of the hydraulic jack 3 may be indirectly fixed to the distributor 1, alongside the latter, as observable hereinafter with reference to FIGS. 9 and 10.

The cylinder 4 is without an autonomous cooling circuit that conventionally uses a cooling liquid, and the cooling thereof occurs by means of thermal exchange contact with a plate of the molding apparatus. Such plate may include any mold plate and in particular, like in the case of FIGS. 1 to 8, consists in the clamping plate indicated with 6. Alternatively, this could be a component of such plate or of the hot runner plate (not represented) or of the die (not represented) of the mold in the case where the hydraulic jack is arranged laterally to the hot runner 1, as observable in the case of FIGS. 9 and 10.

It should be observed that the clamping plate 6 or other plates (not shown) can be provided with a liquid cooling circuit, indicated with 12, or it can be without one.

In order to guarantee the thermal exchange contact between the cylinder 4 of the hydraulic jack 3 and the clamping plate 6 the invention provides for, in place of a thrust spring member like in the case of the prior art, at least the body 7 made of thermally conductive material that at least partly, and preferably for a substantial and almost full perimeter width, surrounds the cylinder 4. This body 7, made of thermally conductive material, is axially slidable against the outer surface of the cylinder 4 for a stroke of limited degree by means of one or more C-shaped lateral bands 8 engaged—at one end—with the cylinder 4 and—at the opposite end—an axial clearance in a groove 9 of the body 7, as better observable in FIG. 8.

The body 7 may have a generally L-shaped or C-shaped section with an end radial wall 10 facing the bottom plate 11 of the cylinder 4 and defining a flat surface at planar contact with the clamping plate 6. The lateral wall of the body 7, indicated with 22, is in sliding thermal exchange contact with the cylinder 4 of the hydraulic jack 3.

The bottom plate 11 may consist in an element separated from the body of the cylinder 4, or it can be made of a single piece with the cylinder 4.

In order to constantly maintain the wall 10 of the body 7 in thermal exchange contact with the clamping plate 6, the invention provides for different alternative solutions among which the preferred one, represented in FIGS. 2 to 5, applies a magnetic attractive force. To this end, incorporated in the radial wall 10 are permanent magnets 13 facing the clamping plate 6 and cooperating therewith. It should be observed that the arrangement could be inverted, or there could be provided for the incorporation of the magnets 13 in the clamping plate 6.

As observable hereinafter, the magnetic force may also be a repulsive force instead of an attractive force.

Figure 7:
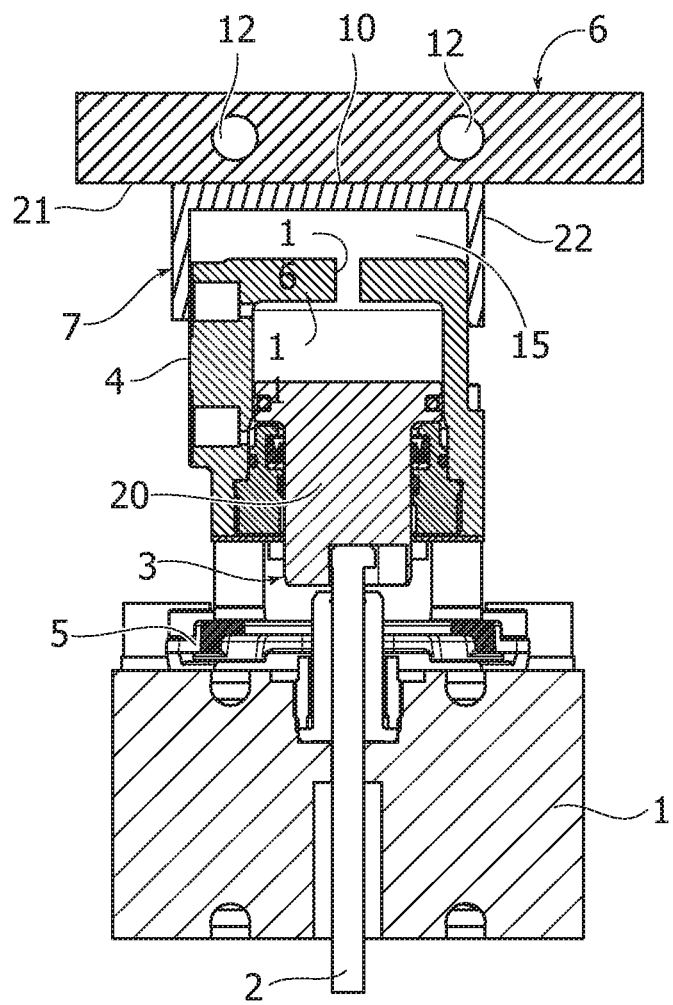
FIG. 7 shows a second variant of FIG. 4.
Figure 8:
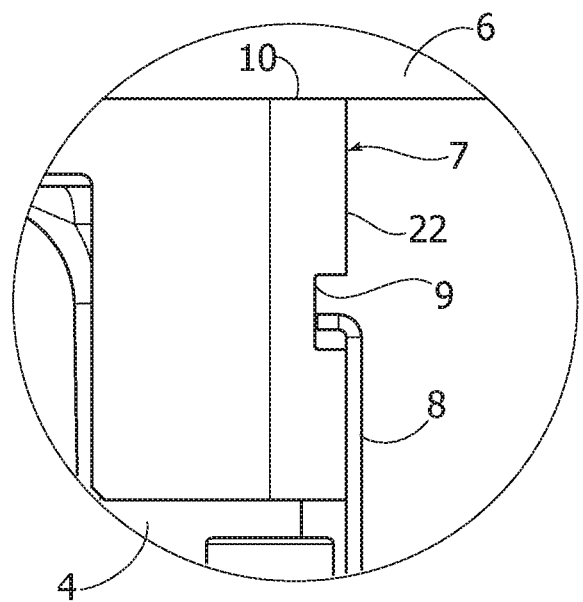
FIG. 8 shows—in an enlarged scale—a detail of FIG. 1.

FIGS. 6 and 7 show two variants in which the thermal exchange contact between the body 7 and the clamping plate 6 is obtained by means of a pressurised fluid. The solution represented in FIG. 6 provides for a pneumatic thrust which occurs by means of a pressurised gas supplied, through an inlet 14, into a sealed chamber 15 formed between the bottom plate 11 of the cylinder 4 and the wall 10 of the body 7.

In the case of FIG. 7 the body 7 is restrained against the clamping plate 6 by a hydraulic thrust conveniently carried out by the hydraulic fluid for actuating the hydraulic jack 3: to this end, the sealed chamber 15 is placed in communication with the internal of the cylinder 4 through one or more gates 16 formed in the bottom plate 11.

The same arrangement of FIG. 7 can be provided for in the case where the hydraulic jack 3 is actuated pneumatically instead of hydraulically.

According to a further alternative solution not represented in the drawings, the thermal exchange contact between the body 7 and the clamping plate 6 can be obtained by means of an electrical drive force, or through an electric actuator configured for pushing, by means of a transmission known to a man skilled in the art, the transversal wall 10 against the plate 6.

It should be observed that the various alternatives described above could be combined with each other: so that the pneumatic thrust, the hydraulic thrust and the electrical drive force could be combined with each other and/or with the magnetic attraction.

Figure 9:
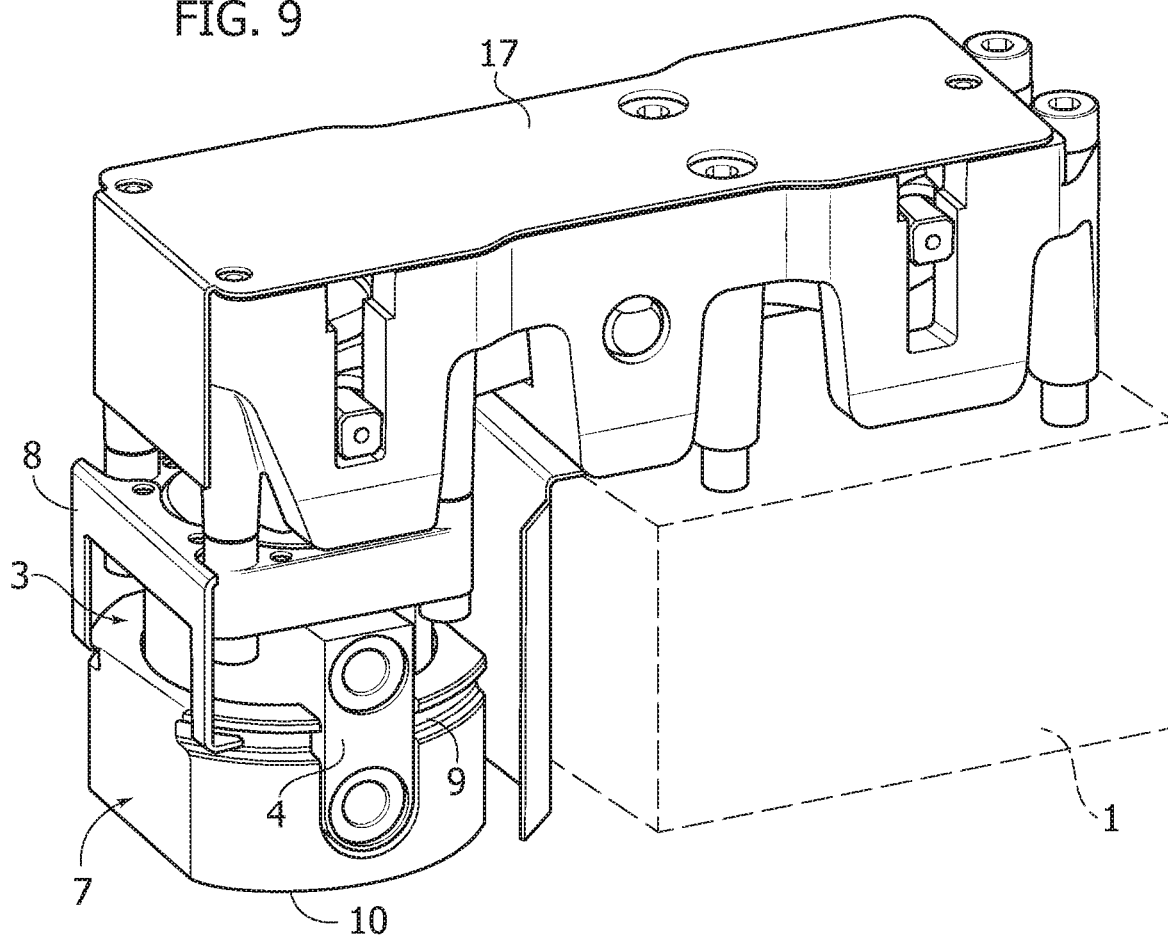
FIG. 9 is a perspective view showing a variant of FIG. 3.
Figure 10:
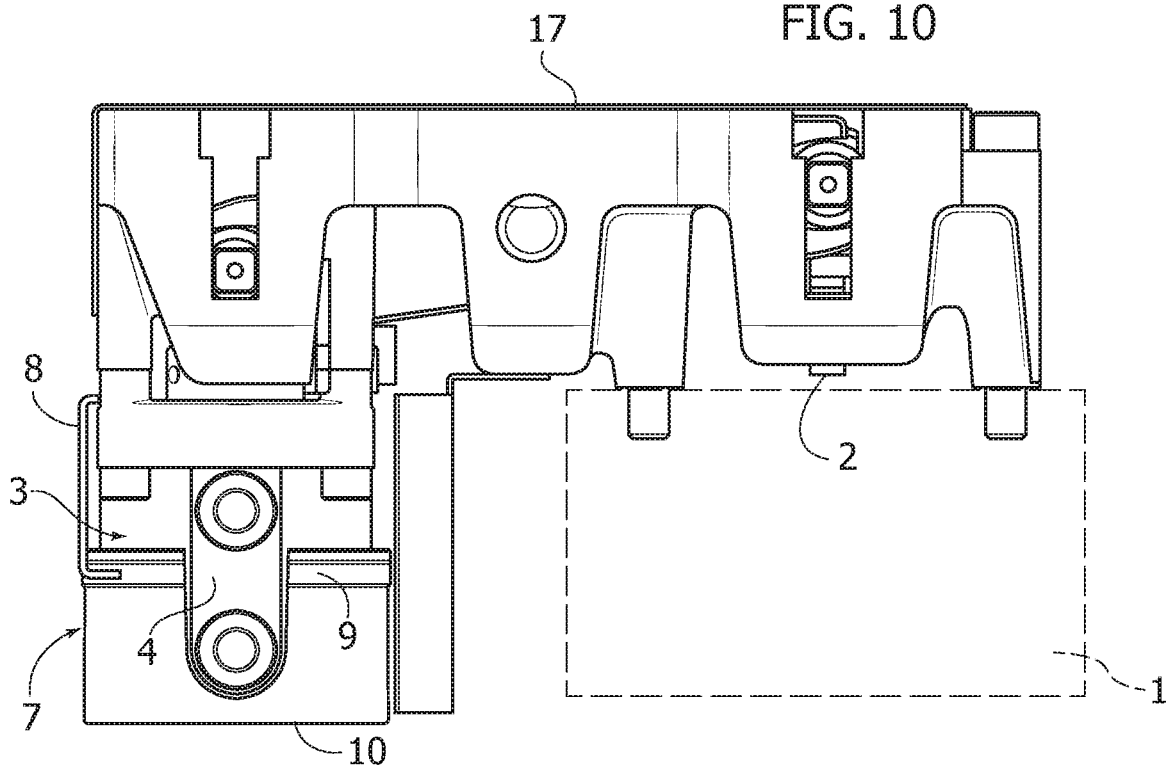
FIG. 10 is an elevational view of FIG. 9.

As previously mentioned, the fluid jack 3 can be fixed, instead of directly onto the hot runner 1, laterally thereto for example as represented in FIGS. 9 and 10. In this case, the hydraulic jack 3 with the body 7 is carried by a support 17 including a mechanical transmission for the actuation of the valve pin 2 of the injector (not visible in these figures). The radial wall of the body 7 is in this case kept at thermal exchange contact, by means of one or more of the previously described alternatives, using a mold plate different from the clamping plate 6 and for example consisting in the die plate or in the hot runner plate, both not represented in that known to a man skilled in the art.

According to a further alternative not represented in the drawings, the plate against which the body 7 is in thermal exchange contact can consist in the plane or another element—magnetic or non-magnetic—of the molding apparatus and the relative press to which the mold is associated.

Figure 11:
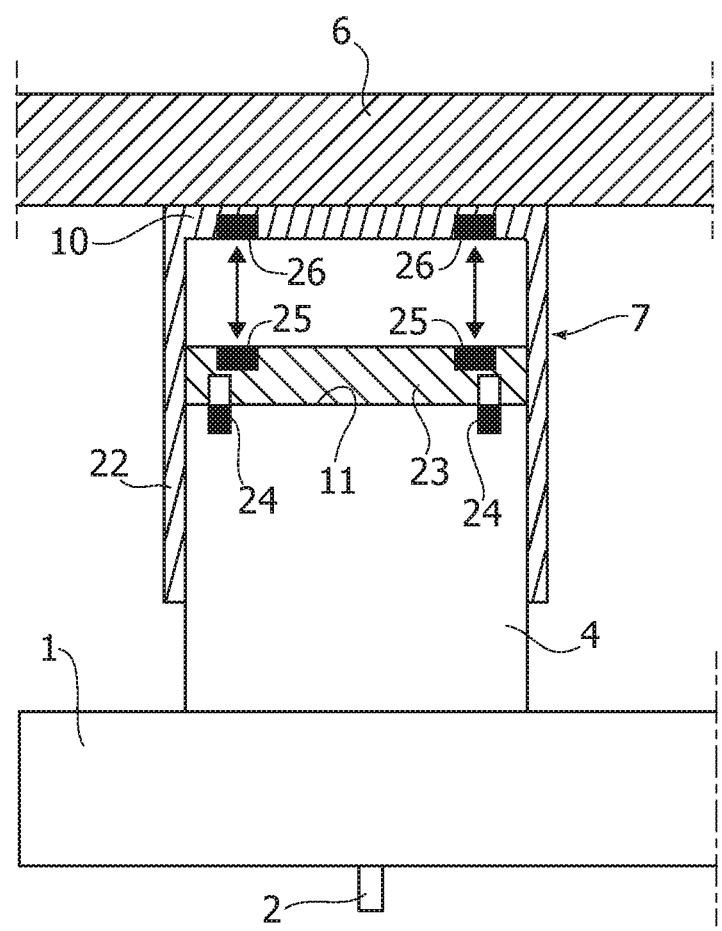
FIG. 11 shows a further variant of FIG. 4.

In the further variant of the invention schematically represented in FIG. 11, besides the body 7—kept in exchange contact using the cylinder 4 of the hydraulic jack 3 on the one side and using the plate 6 on the other side, provided for is an auxiliary element 23 made of thermally conductive material kept at front thermal exchange contact against the bottom plate 11 of the cylinder 4 and arranged at thermal exchange slidable lateral contact with the lateral wall 22 of the body 7. Thus, the heat dissipation of the hydraulic jack 3 occurs in an even more efficient manner.

The auxiliary element 23 is kept at constant contact with the bottom plate 11 for example by means of the attraction force obtained by the permanent magnets 24. Furthermore, there can be further provided for permanent magnets 25, 26 respectively carried by the auxiliary element 23 and by the plate 6 and configured so as to obtain a magnetic repulsive force suitable to press the radial wall 10 of the body 7 against the plate 6.

The magnets 26 can also be directly applied to the bottom plate 11 of the cylinder 4 should the auxiliary element 23 not be present, and the magnetic repulsive force can also be combined with a pressurised fluid thrust and/or with an electrical drive force, as described previously.

Lastly, it should be observed that the thermal exchange contact between the body 7 and the plate 6 can be obtained not only by the radial wall 10 but also by the lateral wall 22. This lateral contact can be obtained directly, and in this case the lateral wall 22 will be at least partly inserted into a recess or complementary seat of the plate 6 or of an element of the mold, or indirectly by means of an intermediate element fixed to the plate.

In light of the above it will be clear that the invention is capable of ensuring, during the operation of the molding apparatus, an efficient heat dissipation of the hydraulic jack 3 in a constructively easy and economic manner.

Obviously, the construction details and the embodiments may widely vary with respect to what has been described and illustrated, without departing from the scope of protection of the invention as described in the claims that follow. Thus, for example, the invention also applies to the case where the actuator of the injector consists of an electric motor instead of a fluid jack.

The invention claimed is:

1. An apparatus for injection molding of plastic material, comprising:
    a mold,
    at least one plate,
    a hot runner distributor of the plastic material,
    at least one injector for injecting the plastic material from the distributor into the mold, and
    an actuator for controlling opening and closing of the at least one injector, the actuator including a fluid jack having a cylinder,
    wherein the actuator is supported by the hot runner distributor and cooling thereof is performed by thermal exchange contact with said at least one plate,
    wherein for cooling of the actuator there is provided at least one body made of thermally conductive material at least partly surrounding the actuator in an axially slidable fashion and maintained in thermal exchange contact with said at least one plate by a magnetic force,
    wherein said body has a radial wall facing said cylinder and defining a planar contact surface with said at least one plate,
    wherein said body is free from a liquid cooling circuit, and
    wherein at least one from among said radial wall and said at least one plate incorporates at least one permanent magnet.

2. The apparatus according to claim 1, wherein said radial wall is restrained against said at least one plate by a magnetic attractive force.

3. The apparatus according to claim 1, wherein said radial wall is restrained against said at least one plate by a combination of the magnetic force and at least one of a pressurised fluid thrust and an electric drive force.

4. The apparatus according to claim 1, wherein the actuator is directly fixed to the distributor and said at least one plate is a mold clamping plate or a hot runner plate.

5. The apparatus according claim 1, wherein the actuator is indirectly fixed to the distributor laterally thereto and said at least one plate is a die plate or a hot runner plate.

6. The apparatus according to claim 1, wherein said at least one plate is an element of the injection apparatus.

7. The apparatus according to claim 1, wherein said body comprises an L-shaped element.

8. The apparatus according to claim 1, wherein said body has a lateral wall in axial sliding contact with the cylinder of the fluid jack.

9. The apparatus according to claim 8, wherein said lateral wall of the body is at least partly in thermal exchange contact with said plate.

10. The apparatus according to claim 1, wherein the apparatus further comprises an auxiliary element made of thermally conductive material kept in front thermal exchange contact against said actuator and arranged in thermal exchange slidable lateral contact with said body.

11. The apparatus according to claim 10, wherein said auxiliary element is kept at contact with said actuator by a magnetic attractive force.

12. The apparatus according to claim 1, wherein said radial wall is restrained against said at least one plate by a magnetic repulsive force.

* * * * *